(Model.)

W. H. HOOPES.
Paint.

No. 231,960.  Patented Sept. 7, 1880.

Witnesses:
W. A. Bertram,
D. L. H. Barclay.

Inventor:
W. H. Hoopes.
by
R. W. Williams,
Attorney.

UNITED STATES PATENT OFFICE.

WILLIAM H. HOOPES, OF BALTIMORE, MARYLAND.

PAINT.

SPECIFICATION forming part of Letters Patent No. 231,960, dated September 7, 1880.

Application filed March 31, 1880. (Specimens.)

*To all whom it may concern:*

Be it known that I, WILLIAM H. HOOPES, of Baltimore city, State of Maryland, have invented certain new and useful Improvements in Paints; and I hereby declare the same to be fully, clearly, and exactly described as follows, reference being had to the accompanying drawings, in which—

Figure 1:
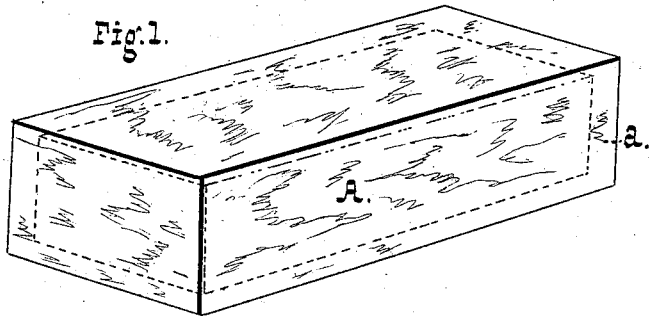
Figure 2:
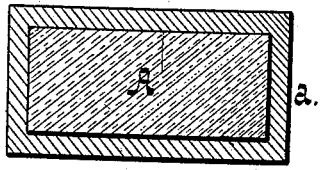

Figure 1 is a perspective, and Fig. 2 a transverse sectional, view of a paint-block embodying my invention.

My invention has reference to paints known as "emulsion" paints, into the composition of which water enters as a constituent; and it consists in a block of paint-body completely incased in a saponaceous body, whereby the contained matter is prevented from deteriorating or hardening, as it would do were it exposed to the air, and the entire block is adapted for immediate use by simply adding to it the proper quantity of water.

In practice I prepare a paint-body by thoroughly mixing together the following ingredients: silica, in any impalpable form—such, by preference, as tripoli or diatomaceous earth—seventy-nine parts; ferric oxide, three parts; alumina, in the form of clay or kaolin, four parts; magnesia, one part; water, (combined,) thirteen parts. To this is next added tungstate of soda, five parts, and pearlash, four parts. The whole is then combined with the paint-body, (be it zinc-white, baryta-white, white lead, or gypsum, or other usual body,) and with a coloring-matter, in proportions determined by the use to which the paint is to be put and the color desired, for ordinary use equal parts of the body and of the composition answering well. Oil, turpentine, and drier are then added until the mass has the consistency of soft dough, when it is incased in a shell of soap, as shown in the accompanying drawings, in which A represents the paint body, and *a* the incasing-soap.

The soap-shell bears to its contents a proportion, by weight, of about one to six; but it will be understood that the proportions of ingredients may be varied somewhat from the proportions given without departing from the spirit of my invention as expressed in the particular paint described.

The cake or block is ready for use upon throwing it into a proper quantity of water (by preference hot) to reduce the whole to the desired consistency. The soap immediately dissolves, and the alkali and oil produce an emulsion therewith, in which the body materials remain suspended, the whole constituting an excellent distemper-paint.

The protecting-cover of soap, as hereinbefore stated, prevents the hardening or deterioration of the incased block for an indefinite period.

What I claim is—

1. As a new article of manufacture, a block of paint-body incased in a saponaceous envelope, as and for the purpose set forth.

2. A paint-block consisting of a paint-body of silica, ferric oxide, alumina, magnesia, tungstate of soda, pearlash, and water, mixed with a suitable vehicle and incased in a saponaceous envelope, as set forth.

WM. H. HOOPES.

Witnesses:
R. D. WILLIAMS,
JNO. T. MADDOX.